(12) United States Patent
Ispasoiu et al.

(10) Patent No.: US 12,556,793 B2
(45) Date of Patent: Feb. 17, 2026

(54) NANOPHOTONIC HIGH DYNAMIC RANGE SENSOR PIXEL

(71) Applicant: SEMICONDUCTOR COMPONENTS INDUSTRIES, LLC, Scottsdale, AZ (US)

(72) Inventors: Radu Ispasoiu, Santa Clara, CA (US); Swarnal Borthakur, Boise, ID (US); Byounghee Lee, Boise, ID (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 287 days.

(21) Appl. No.: 18/183,106

(22) Filed: Mar. 13, 2023

(65) Prior Publication Data
US 2024/0314417 A1  Sep. 19, 2024

(51) Int. Cl.
*H04N 23/55* (2023.01)
*H04N 25/13* (2023.01)

(52) U.S. Cl.
CPC ............. *H04N 23/55* (2023.01); *H04N 25/13* (2023.01)

(58) Field of Classification Search
None
See application file for complete search history.

(56) References Cited

U.S. PATENT DOCUMENTS

2016/0353039 A1* 12/2016 Rephaeli ............ G02B 27/1013
2018/0045953 A1   2/2018 Fan et al.
2019/0131333 A1   5/2019 Borthakur et al.
2019/0196068 A1   6/2019 Tsai et al.
2021/0118938 A1   4/2021 Roberts et al.
2021/0151482 A1   5/2021 Phan et al.
2021/0358993 A1* 11/2021 Mao ..................... H04N 25/133
2022/0326415 A1* 10/2022 Yun ....................... G02B 3/0043
2023/0020980 A1*  1/2023 Mun ................... H10F 39/8023
2023/0417960 A1  12/2023 Zhao et al.

OTHER PUBLICATIONS

Yun, Seokho, et al., "Highly Efficient Color Separation and Focusing in the Sub-micron CMOS Image Sensor", International Electron Devices Meeting (IEDM), Dec. 2021, 4 pages.
Camayd-Munoz, Philip, et.al., "Multifunctional Volumetric Metaoptics for Color and Polarization Image Sensors", Optica, vol. 7, Issue 4, Apr. 2020, pp. 280-283.
Zhao, Nathan, et al., "Perfect RGB-IR Color Routers for Sub-Wavelength Size CMOS Image Sensor Pixels", Advanced Photonics Research, Nov. 2020, 16 pages.

(Continued)

*Primary Examiner* — Mark T Monk
(74) *Attorney, Agent, or Firm* — Dickinson Wright PLLC; Erik A. Heter

(57) ABSTRACT

Image sensor pixels, imaging systems, and methods for constructing image sensor pixels. The image sensor pixel includes a high-light photodetector, a plurality of low-light photodetectors, and a spectral router. The plurality of low-light photodetectors is positioned around the high-light photodetector. The spectral router is positioned above the high-light photodetector and the plurality of low-light photodetectors. The spectral router is configured to route a portion of light received at the spectral router to one or more of the plurality of low-light photodetectors.

20 Claims, 8 Drawing Sheets

(56) References Cited

OTHER PUBLICATIONS

Innocent, Manuel, et al., "Pixel with nested photo diodes and 120 db single exposure dynamic range", imagesensors.org, 2019, 4 pages.
Zhao, et al., "Freeform Metasurface Color Router for Deep Submicron Pixel Image Sensors", Stanford University, Retrieved Jun. 27, 2025, 4 pages, https://techfinder.stanford.edu/technology/perfect-color-routers-solid-state-image-sensors.

* cited by examiner

NANOPHOTONIC HIGH DYNAMIC RANGE SENSOR PIXEL

BACKGROUND

Image sensors are used in electronic devices such as cellular telephones, cameras, and computers to capture images. In particular, an electronic device is provided with an array of image sensor pixels arranged in a grid pattern. Each image sensor pixel receives incident photons, such as light, and converts the photons into electrical signals. Column circuitry is coupled to each column for reading out sensor signals from each image sensor pixel.

SUMMARY

A high dynamic range (HDR) scene luminance typically ranges from 60 to 120 decibels. However, conventional cameras' scene capture ranges are typically within 40 to 60 decibels. Thus, conventional cameras' scene capture luminance is less than the human eye's intra-scene capture range. A binned split-pixel architecture provides HDR imaging. There are many types of split-pixel architectures. For example, a pixel may be made up of a small-size photodiode and a large-size photodiode with the same color and asymmetric within a certain area. However, this type of architecture suffers from angular crosstalk asymmetry. Another example has same-size photodiodes and HDR is accomplished by binning multiple photodetectors with the same color. In this type of architecture, a center photodetector is used for high-light conditions and a microlens is used to divert light away from the center photodetector. However, microlenses have limitations and the optical ratio varies over different wavelengths. The optical ratio is the ratio of light entering the high-light photodetector versus the low-light photodetectors. The optical ratio varies because of the competing effects of transmission and diffraction depending on the wavelength (for example, red, green, and blue) through a small microlens. The optical ratio variation will vary the HDR decibels, for example, from blue light to red light. Optical ration variation causes artifacts in HDR imaging. Also, in all these options the use of organic color filters inherently reduces the amount of transmitted light through the color filters. This is a problem for low-light conditions in HDR imaging. Thus, the present disclosure provides image sensor pixels, imaging systems, and methods that, among other things, provide HDR imaging using nanophotonic light guides (or spectral routers) to control optical ratio between high-light and low-light photodetectors of binned split-pixels and enable high light transmission because there is no loss due to organic color filters.

The present disclosure provides an image sensor pixel including, in one implementation, a high-light photodetector, a plurality of low-light photodetectors, and a spectral router. The plurality of low-light photodetectors is positioned around the high-light photodetector. The spectral router is positioned above the high-light photodetector and the plurality of low-light photodetectors. The spectral router is configured to route a portion of light received at the spectral router to one or more of the plurality of low-light photodetectors.

The present disclosure also provides an imaging system including, in one implementation, a lens system, an imaging controller, and an image sensor. The image sensor is in operational relationship with the lens system. The image sensor is electrically coupled to the imaging controller. The image sensor includes an array of image sensor pixels. Each of the image sensor pixels includes a high-light photodetector, a plurality of low-light photodetectors, and a spectral filter. The plurality of low-light photodetectors is positioned around the high-light photodetector. The spectral router is positioned above the high-light photodetector and the plurality of low-light photodetectors. The spectral router is configured to route a portion of light received at the spectral router to one or more of the plurality of low-light photodetectors.

The present disclosure further provides a method for constructing an image sensor pixel. The method includes forming a high-light photodetector. The method also includes forming a plurality of low-light photodetectors positioned around the high-light photodetector. The method further includes forming a spectral router positioned above the high-light photodetector and the plurality of low-light photodetectors. The spectral router is configured to route a portion of light received at the spectral router to one or more of the plurality of low-light photodetectors.

BRIEF DESCRIPTION OF THE DRAWINGS

For a detailed description of example implementations, reference will now be made to the accompanying drawings in which.

DEFINITIONS

Figure 1A:
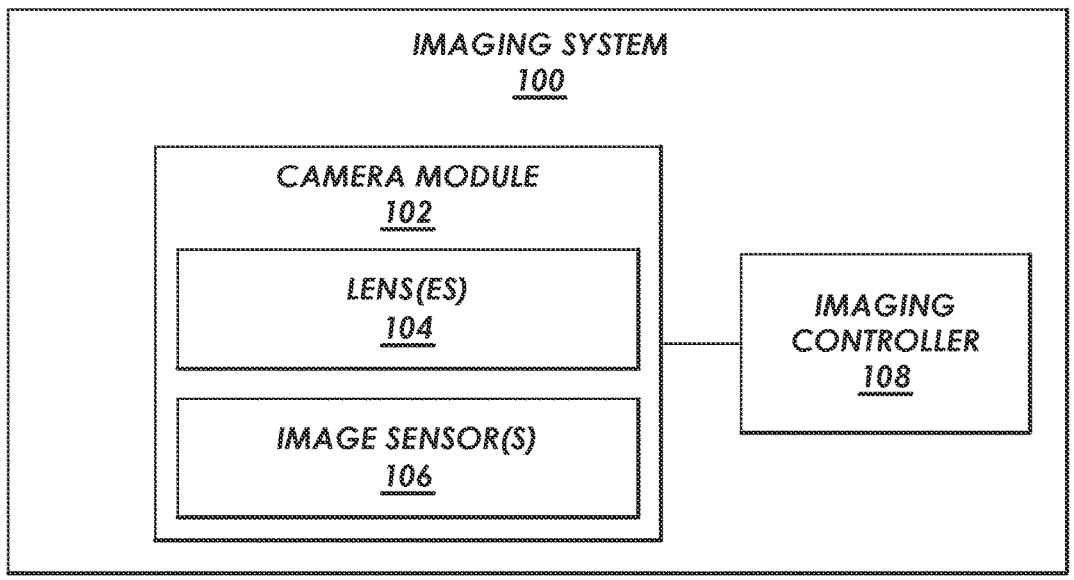
FIG. 1A is a block diagram of an example of an imaging system in accordance with some implementations.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

Terms defining an elevation, such as "above," "below," "upper", and "lower" shall be locational terms in reference to a direction of light incident upon a pixel array and/or an image pixel. Light entering shall be considered to interact with or pass objects and/or structures that are "above" and "upper" before interacting with or passing objects and/or structures that are "below" or "lower." Thus, the locational terms may not have any relationship to the direction of the force of gravity.

In relation to electrical devices, whether stand alone or as part of an integrated circuit, the terms "input" and "output" refer to electrical connections to the electrical devices, and shall not be read as verbs requiring action. For example, a differential amplifier, such as an operational amplifier, may have a first differential input and a second differential input, and these "inputs" define electrical connections to the operational amplifier, and shall not be read to require inputting signals to the operational amplifier.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Light" or "color" shall mean visible light ranging between about 380 and 700 nanometers (nm). "Light" or "color" shall also mean invisible light, such as infrared light ranging between about 800 nm and 1 millimeter. "Light" or "color" shall also mean invisible light, such as ultraviolet light ranging between about 100 to 400 nm.

"Controller" shall mean, alone or in combination, individual circuit components, an application specific integrated circuit (ASIC), a microcontroller with controlling software, a reduced-instruction-set computer (RISC) with controlling software, a digital signal processor (DSP), a processor with controlling software, a programmable logic device (PLD), a field programmable gate array (FPGA), or a programmable system-on-a-chip (PSOC), configured to read inputs and drive outputs responsive to the inputs.

DETAILED DESCRIPTION

The following discussion is directed to various implementations of the invention. Although one or more of these implementations may be preferred, the implementations disclosed should not be interpreted, or otherwise used, as limiting the scope of the present disclosure, including the claims. In addition, one skilled in the art will understand that the following description has broad application, and the discussion of any implementation is meant only to be exemplary of that implementation, and not intended to intimate that the scope of the present disclosure, including the claims, is limited to that implementation.

Various examples are directed to imaging systems, image sensor pixels, and related methods. More particularly, at least some examples are directed to image sensor pixels designed and constructed to provide high dynamic range with controllable optical ratio. More particularly, various examples are directed to binned split-pixels that use nano-photonic light guides to direct incoming light to low-light photodetectors. The specification now turns to an example system to orient the reader.

FIG. 1A shows an example of an imaging system 100. In particular, the imaging system 100 may be a portable electronic device such as a camera, a cellular telephone, a tablet computer, a webcam, a video camera, a video surveillance system, or a video gaming system with imaging capabilities. In other cases, the imaging system 100 may be an automotive imaging system. The imaging system 100 illustrated in FIG. 1A includes a camera module 102 that may be used to convert incoming light into digital image data. The camera module 102 may include one or more lenses 104 and one or more corresponding image sensors 106. The lenses 104 may include fixed and/or adjustable lenses. During image capture operations, light from a scene may be focused onto the image sensor 106 by the lenses 104. The image sensor 106 may comprise circuitry for converting analog pixel data into corresponding digital image data to be provided to the imaging controller 108. If desired, the camera module 102 may be provided with an array of lenses 104 and an array of corresponding image sensors 106.

The imaging controller 108 may include one or more integrated circuits. The imaging circuits may include image processing circuits, microprocessors, and storage devices, such as random-access memory, and non-volatile memory. The imaging controller 108 may be implemented using components that are separate from the camera module 102 and/or that form part of the camera module 102, for example, circuits that form part of the image sensor 106. Digital image data captured by the camera module 102 may be processed and stored using the imaging controller 108. Processed image data may, if desired, be provided to external equipment, such as computer, external display, or other device, using wired and/or wireless communications paths coupled to the imaging controller 108.

Figure 1B:
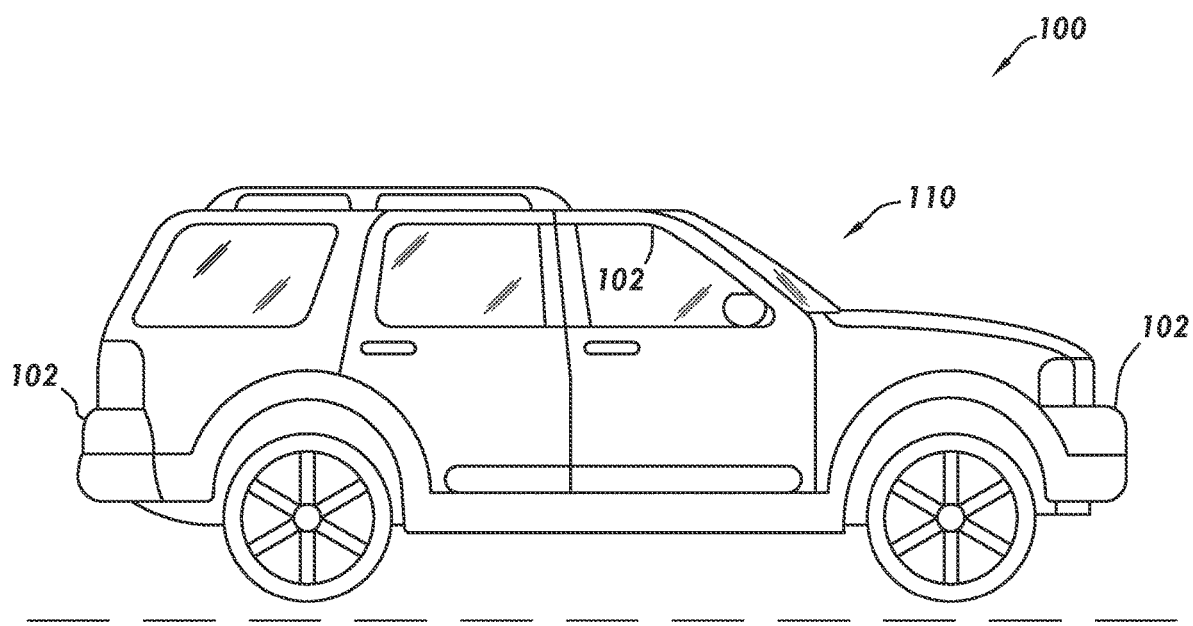
FIG. 1B is a diagram of an example of an imaging system incorporated in a vehicle in accordance with some implementations.

FIG. 1B shows another example of the imaging system 100. The imaging system 100 illustrated in FIG. 1B comprises an automobile or vehicle 110. The vehicle 110 is illustratively shown as a passenger vehicle, but the imaging system 100 may be other types of vehicles, including commercial vehicles, on-road vehicles, and off-road vehicles. Commercial vehicles may include busses and tractor-trailer vehicles. Off-road vehicles may include tractors and crop harvesting equipment. In the example of FIG. 1B, the vehicle 110 includes a forward-looking camera module 102 arranged to capture images of scenes in front of the vehicle 110. Such forward-looking camera module 102 can be used for any suitable purpose, such as lane-keeping assist, collision warning systems, distance-pacing cruise-control systems, autonomous driving systems, and proximity detection. The vehicle 110 further comprises a backward-looking camera module 102 arranged to capture images of scenes behind the vehicle 110. Such backward-looking camera module 102 can be used for any suitable purpose, such as collision warning systems, reverse direction video, autonomous driving systems, proximity detection, monitoring position of overtaking vehicles, and backing up. The vehicle 110 further comprises a side-looking camera module 102 arranged to capture images of scenes beside the vehicle 110. Such side-looking camera module can be used for any suitable purpose, such as blind-spot monitoring, collision warning systems, autonomous driving systems, monitoring position of overtaking vehicles, lane-change detection, and proximity detection. In situation in which the imaging system 100 is a vehicle, the imaging controller 108 may be a controller of the vehicle 110. The discussion now turns in greater detail to the image sensor 106 of the camera module 102.

Figure 2A:
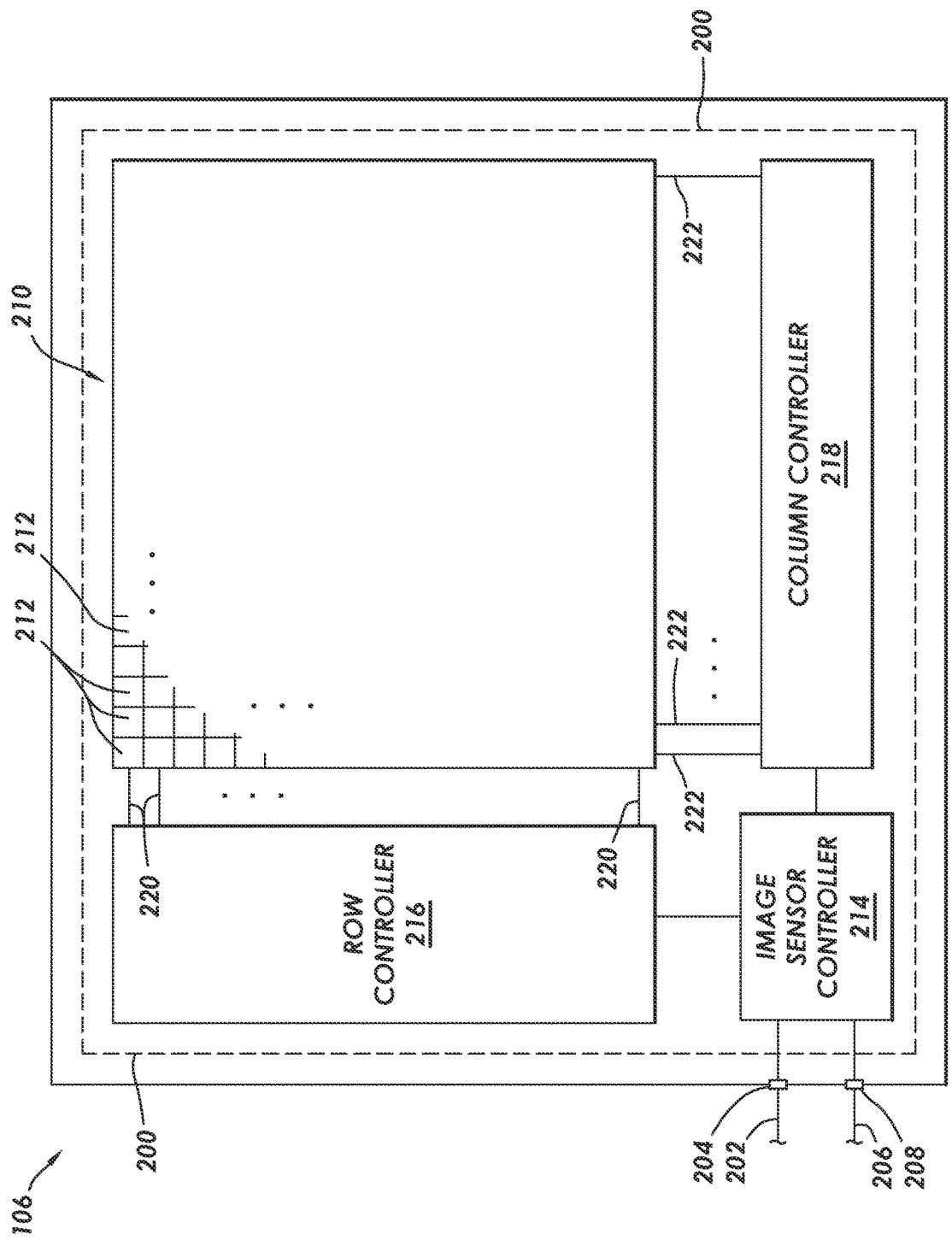
FIG. 2A is a partial schematic and a partial block diagram of an example of an image sensor in accordance with some implementations.

FIG. 2A shows an example of the image sensor 106. In particular, FIG. 2A shows that the image sensor 106 may comprise a substrate 200 of semiconductor material (for example, silicon) encapsulated within packaging to create a packaged semiconductor device or packaged semiconductor product. Bond pads or other connection points of the substrate 200 couple to terminals of the image sensor 106, such as the serial communication channel 202 coupled to terminal (s) 204, and capture input 206 coupled to terminal 208. Additional terminals will be present, such as ground, common, or power, but the additional terminals are omitted so as not to unduly complicate the figure. While a single instance of the substrate 200 is shown, in other cases multiple substrates may be combined to form the image sensor 106 to form a multi-chip module.

The image sensor 106 comprises a pixel array 210 containing a plurality of image sensor pixels 212 arranged in rows and columns. Pixel array 210, being one example of an "array of pixels," may comprise, for example, hundreds or thousands of rows and columns of image sensor pixels 212. Control and readout of the pixel array 210 may be implemented by an image sensor controller 214 coupled to a row controller 216 and a column controller 218. The row controller 216 may receive row addresses from image sensor controller 214 and supply corresponding row control signals to image sensor pixels 212, such as reset, row-select, charge transfer, dual conversion gain, and readout control signals. The row control signals may be communicated over one or more conductors, such as row control paths 220.

Column controller 218 may be coupled to the pixel array 210 by way of one or more conductors, such as column lines 222. Column controllers may sometimes be referred to as column control circuits, readout circuit, or column decoders. Column lines 222 may be used for reading out image signals from image sensor pixels 212 and for supplying bias currents and/or bias voltages to image sensor pixels 212. If desired, during pixel readout operations, a pixel row in the pixel array 210 may be selected using row controller 216 and image signals generated by image sensor pixels 212 in that pixel row can be read out along column lines 222. The column controller 218 may include sample-and-hold circuitry for sampling and temporarily storing image signals read out from pixel array 210, amplifier circuitry, analog-to-digital conversion (ADC) circuitry, bias circuitry, column memory, latch circuitry for selectively enabling or disabling the column circuitry, or other circuitry that is coupled to one or more columns of pixels in the pixel array 210 for operating the image sensor pixels 212 and for reading out image signals from the image sensor pixels 212. ADC circuitry in the column controller 218 may convert analog pixel values received from the pixel array 210 into corresponding digital image data. Column controller 218 may supply digital image data to the image sensor controller 214 and/or the imaging controller 108 (FIG. 1A) over, for example, the serial communication channel 202.

Figure 2B:
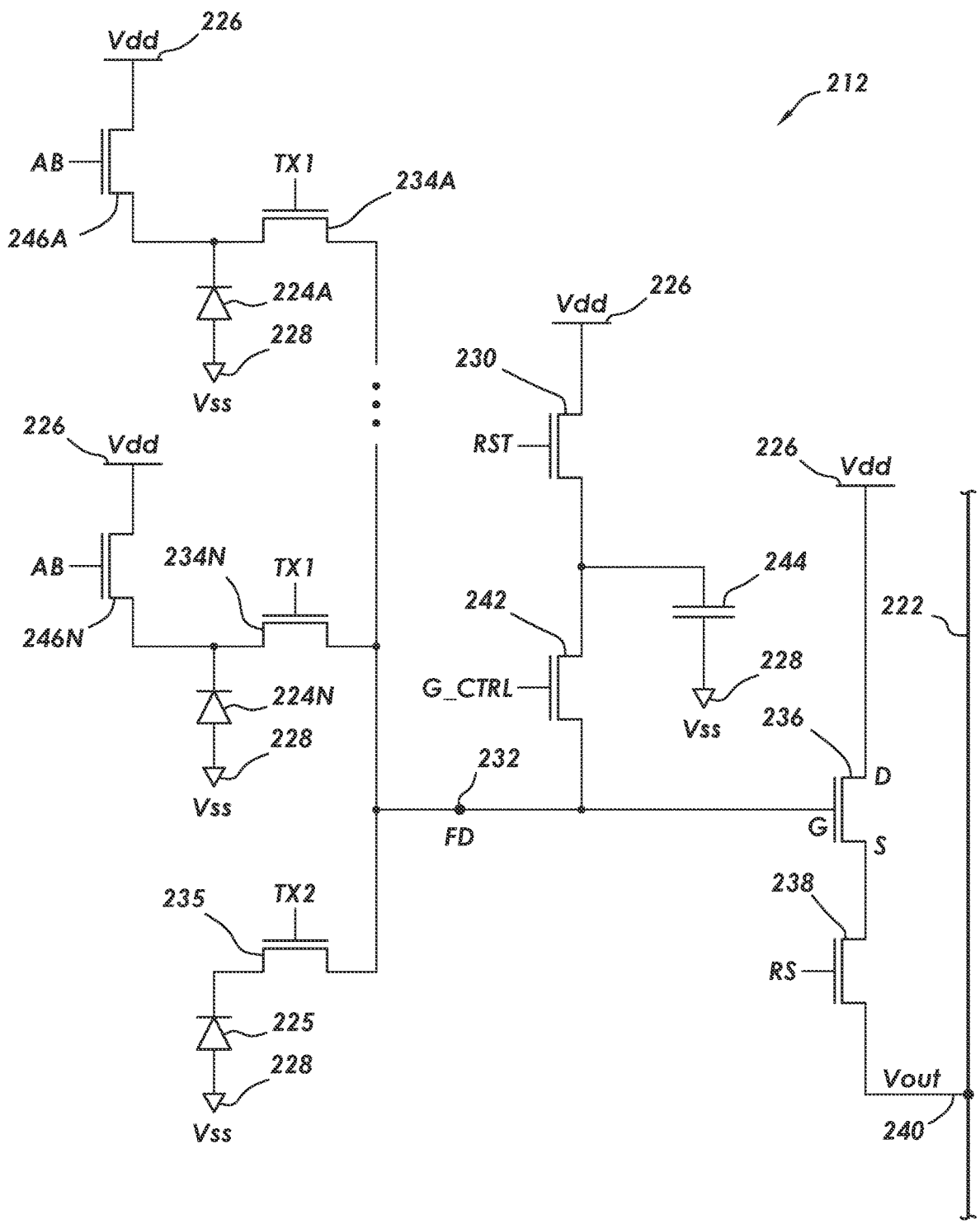
FIG. 2B is a schematic of an example of circuitry in an image sensor pixel in accordance with some implementations.

FIG. 2B shows an example of circuitry in the image sensor pixel 212. The image sensor pixel 212 may have fewer, additional, or different components in different configurations than the one illustrated in FIG. 2B. In particular, FIG. 2B shows that the image sensor pixel 212 may comprise a plurality of low-light photodetectors 224A through 224N (for example, photodiodes) and a high-light photodetector 225. A positive power supply voltage (Vdd) may be supplied at a positive power supply terminal 226. A ground power supply voltage may be supplied at a ground terminal 228. Incoming light is gathered by the low-light photodetectors 224A through 224N and the high-light photodetector 225 and converted to electrical charge.

Before an image is acquired, a reset control signal RST may be asserted. The reset control signal RST makes conductive or turns on a reset transistor 230 and resets a floating diffusion (FD) node 232 to a voltage equal or close to the voltage Vss. The reset control signal RST may be de-asserted to make non-conductive or turn off the reset transistor 230. After the reset process is complete, a first transfer gate control signal TX1 may be asserted to turn on a plurality of transfer transistors 234A through 234N. When the gates of the plurality of transfer transistors 234A through 234N are turned on, the charge that has been generated by the low-light photodetectors 224A through 224N in response to incoming light is transferred to the floating diffusion node 232. Alternatively, after the reset process is complete, a second gain control signal TX2 may be asserted to turn on transfer transistor 235. When the gate of the transfer transistor 235 is turned on, the charge that has been generated by the high-light photodetector 225 in response to incoming light is transferred to the floating diffusion node 232. The floating diffusion node 232 exhibits a capacitance that can be used to store the charge that has been transferred from the low-light photodetectors 224A through 224N or from the high-light photodetector 225. The signal associated with the stored charge on the floating diffusion node 232 is buffered by a source-follower transistor 236. A row select transistor 238 connects the source-follower transistor 236 to a column line 222.

When it is desired to read out the value of the stored charge, a control signal RS is asserted. The read-out value may be, for example, the value of the stored charge that is represented by the signal at the source terminal S of the source-follower transistor 236. When the control signal RS is asserted, the row select transistor 238 turns on and a signal Vout that is representative of the magnitude of the charge on the floating diffusion node 232 is produced on an output path 240. Also, when the control signal RS is asserted, the column line 222 can be used to route the signal Vout from the image sensor pixel 212 to readout circuitry, such as the column controller 218 in FIG. 2A.

The image sensor pixel 212 shown in FIG. 2B also includes a gain control transistor 242. When a gain control signal G_CTRL is asserted, the gain control transistor 242 allows overflow charge from the high-light photodetector 225 to be collected in a low-gain capacitor 244. Each of the low-light photodetectors 224A through 224 shown in FIG. 2B include anti-blooming transistors 246A through 246N. When an anti-blooming control signal AB is asserted, the anti-blooming transistors 246A through 246N allow excess charge to flow towards the positive power supply terminal 226 instead of overflowing over the transfer transistors 234A through 234N and toward the low-gain capacitor 244.

Figure 3A:
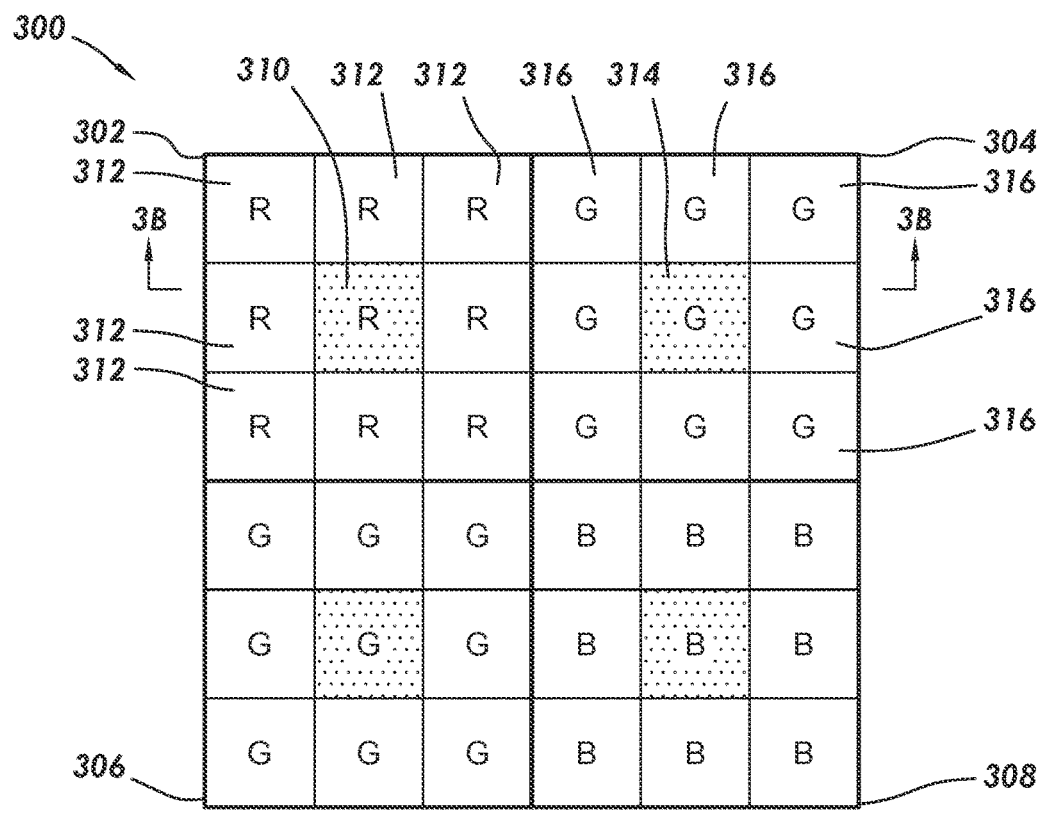
FIG. 3A is an overhead view of an example of a color pattern of binned split-pixels in accordance with some implementations.

FIG. 3A shows an overhead view of an example of a color pattern 300 of binned split-pixels. In particular, the color pattern 300 includes a red pixel 302, a first green pixel 304, a second green pixel 306, and a blue pixel 308. Other color patterns are possible, such as red-yellow-yellow-cyan. The red pixel 302 is one example of an "image sensor pixel." The red pixel 302 shown in FIG. 3A includes a high-light photodetector 310 and a plurality of low-light photodetectors 312 positioned around the high-light photodetector 310. In some implementations, the red pixel 302 may include a single low-light photodetector positioned around the high-light photodetector 310. The high-light photodetector 310 is sometimes called a small photodetector. Further, the low-light photodetectors 312 are sometimes called large photodetectors. The first green pixel 304 shown in FIG. 3A includes a high-light photodetector 314 and a plurality of low-light photodetectors 316 positioned around the high-light photodetector 314. In some implementations, the first green pixel 304 may include a single low-light photodetector positioned around the high-light photodetector 314. A similar discussion regarding the second green pixel 306 and the blue pixel 308, each of which may be configured in a same or similar manner, is omitted so as not to unduly lengthen the specification.

Figure 3B:
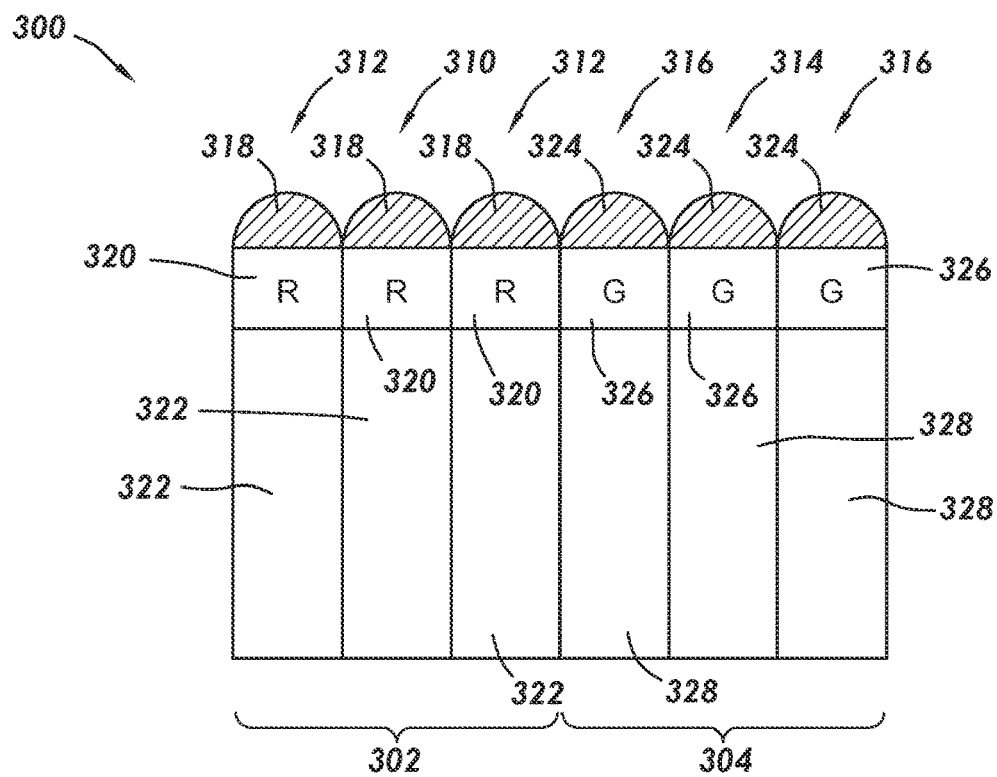
FIG. 3B is a cross-sectional view of the color pattern of FIG. 3A in accordance with some implementations in accordance with some implementations.

FIG. 3B shows a cross-sectional view of the color pattern 300 taken at line 3B-3B of FIG. 3A. In particular, FIG. 3B shows that the high-light photodetector 310 and the low-light photodetectors 312 of the red pixel 302 are each made up of a microlens 318, a red spectral filter 320, and a photosensitive region 322. In the example shown, the photosensitive regions 322 abut each other, but in other cases one or more additional layers, such as oxide layers or deep trench isolation (DTI) structures, may reside between the photosensitive regions 322. Incoming light received at the red pixel 302 initially encounters one or the microlenses 318, which may be a convex lens designed and constructed to direct the incoming light into the lower regions of the red pixel 302. The light then encounters one of the red spectral filters 320. The material of the red spectral filters 320 is selected to pass light having wavelengths corresponding to red, such as between about 595 and 655 nanometers (nm), and to filter or absorb light of other colors. The remaining light then passes into one of the photosensitive regions 322 of the red pixel 302 where the light is absorbed. The absorption of the light produces a corresponding electrical signal having a parameter indicative of the intensity of the red light received, such as the number of photons received during the detection period. The parameter indicative of the intensity may be any suitable parameter, such as amplitude of the current or magnitude amplitude of the voltage. Thus, the red pixel 302 produces an electrical signal proportional the amount of light that finds its way into the photosensitive regions 322 of the red pixel 302.

Similarly, FIG. 3B shows that the high-light photodetector 314 and the low-light photodetectors 316 of the first green pixel 304 are each made up of a microlens 324, a green spectral filter 326, and a photosensitive region 328. In the example shown, the photosensitive regions 328 abut each other, but in other cases one or more additional layers, such as oxide layers or DTI structures, may reside between the photosensitive regions 328. Incoming light received at the first green pixel 304 initially encounters one of the microlenses 324. The light then encounters one of the green spectral filters 326. The remaining light then passes into one of the photosensitive regions 328 of the first green pixel 304 where the light is absorbed. The absorption of the light produces a corresponding electrical signal having a parameter indicative of the intensity of the green light received. Again, the parameter indicative of the intensity may be any suitable parameter, such as amplitude of the current or magnitude amplitude of the voltage. Thus, the first green pixel 304 produces an electrical signal proportional the amount of light that finds its way into the photosensitive regions 328 of the first green pixel 304. A similar discussion regarding the second green pixel 306 and the blue pixel 308, each of which may be configured in a same or similar manner, is omitted so as not to unduly lengthen the specification.

Referring to FIGS. 3A and 3B simultaneously, the combined upper surface area of the low-light photodetectors 312 is about eight times larger than the upper surface area of the high-light photodetector 310. Thus, from pixel layout alone, of the red light that falls on the red pixel 302, the low-light photodetectors 312 absorb about eight times as much light as the high-light photodetector 310. For a binned split-pixel, the difference between the amount of light absorbed by the low-light photodiodes and the amount of light absorbed by the high-light photodiode is known as the optical ratio. Optical ratio is one important metric that governs the dynamic range of an image sensor. As described above, pixel layout is one factor that controls optical ratio. Microlens geometry is another factor that controls optical ratio. However, these two factors alone do not provide a constant optical ratio for all colors in an image sensor. The optical ratio of different colors may vary because of the competing effects of transmission and diffraction depending on the wavelength (for example, red, green, and blue) through a microlens. Optical ratio variation between different colors in an image sensor causes the different colors to exhibit different high dynamic ranges, which causes artifacts in high dynamic range imaging.

Control of optical ratio of image sensors may be improved by use of nanophotonic light guides or spectral routers. In particular, a spectral router is a semiconductor structure that accepts photons incident on an upper surface. The spectral router then diverts photons from the upper surface to the underlying photosensitive regions of the low-light photodiodes. As will be described below, spectral routers enable consistent optical ratios across different wavelengths to provide consistent high dynamic range across different wavelengths in image sensors.

Figure 4A:
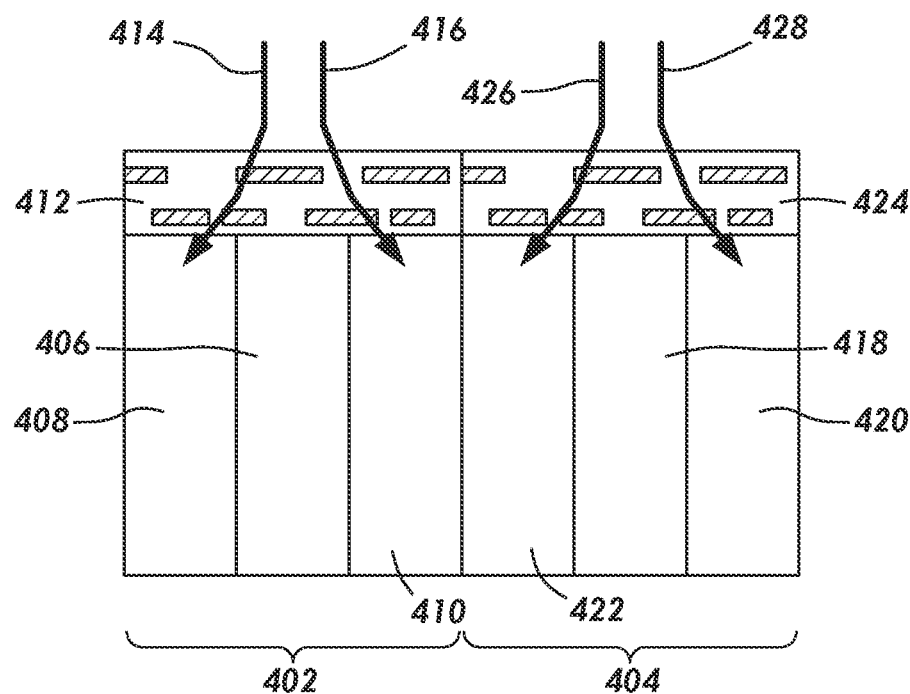
FIG. 4A is a cross-sectional view of an example of binned split-pixels with a spectral router in accordance with some implementations.

FIG. 4A shows a cross-sectional view of an example of two binned split-pixels positioned next to each other. In particular, FIG. 4A shows a red pixel 402 and a green pixel 404. The red pixel 402 shown in FIG. 4A is made up of an inner photosensitive region 406, two outer photosensitive regions 408 and 410, and a spectral router 412. In the example shown, the two outer photosensitive regions 408 and 410 abut the inner photosensitive region 406, but in other cases one or more additional layers, such as oxide layers or DTI structures, may reside between the two outer photosensitive regions 408 and 410 and the inner photosensitive region 406. The inner photosensitive region 406 is configured for high-light detection. The inner photosensitive region 406 is one example a "high-light photodetector." The outer photosensitive regions 408 and 410 are configured for low-light detection. The outer photosensitive regions 408 and 410 are examples "low-light photodetectors." Consider, for purposes of discussion, red light entering the red pixel 402. Examples of red light are illustrated in FIG. 4A by arrows 414 and 416. The red light initially encounters the spectral router 412, which directs the red light to the outer photosensitive regions 408 and 410 of the red pixel 402. Any non-red wavelengths of light are absorbed by the spectral router 412 and only red light is allowed to pass through the spectral router 412. In high-light conditions, some of the red light may be captured by the inner photosensitive region 406 of the red pixel 402. The ratio of red light directed between the inner photosensitive region 406 and the outer photosensitive regions 408 and 410 of the red pixel 402 is adjustable based on the configuration of the spectral router 412. Thus, the spectral router 412 can set the optical ratio of the red pixel 402 to a predetermined value for HDR imaging.

Similarly, the green pixel 404 shown in FIG. 4A is made up of an inner photosensitive region 418, two outer photosensitive regions 420 and 422, and a spectral router 424. In the example shown, the two outer photosensitive regions 420 and 422 abut the inner photosensitive region 418, but in other cases one or more additional layers, such as oxide layers or DTI structures, may reside between the two outer photosensitive regions 420 and 422 and the inner photosensitive region 418. Further, in the example shown, the outer photosensitive region 422 of the green pixel 404 abuts the outer photosensitive region 410 of the red pixel 402, but in other cases one or more additional layers, such as oxide layers or DTI structures, may reside between the outer photosensitive region 422 of the green pixel 404 and the outer photosensitive region 410 of the red pixel 402. Consider, for purposes of discussion, green light entering the green pixel 404. Examples of green light are illustrated in FIG. 4A by arrows 426 and 428. The green light initially encounters the spectral router 424, which directs the green light to the outer photosensitive regions 420 and 422 of the green pixel 404. Any non-green wavelengths of light are absorbed by the spectral router 424 and only green light is allowed to pass through the spectral router 424. In high light conditions, some of the green light may be captured by the inner photosensitive region 418 of the green pixel 404. The ratio of green light directed between the inner photosensitive region 418 and the outer photosensitive regions 420 and 422 of the green pixel 404 is adjustable based on the configuration of the spectral router 424. Thus, the spectral router 424 can set the optical ratio of the green pixel 404 to a predetermined value for HDR imaging. For example, the spectral router 424 can set the optical ratio of the green pixel 404 to be the same as the optical ratio of the red pixel 402.

Figure 4B:
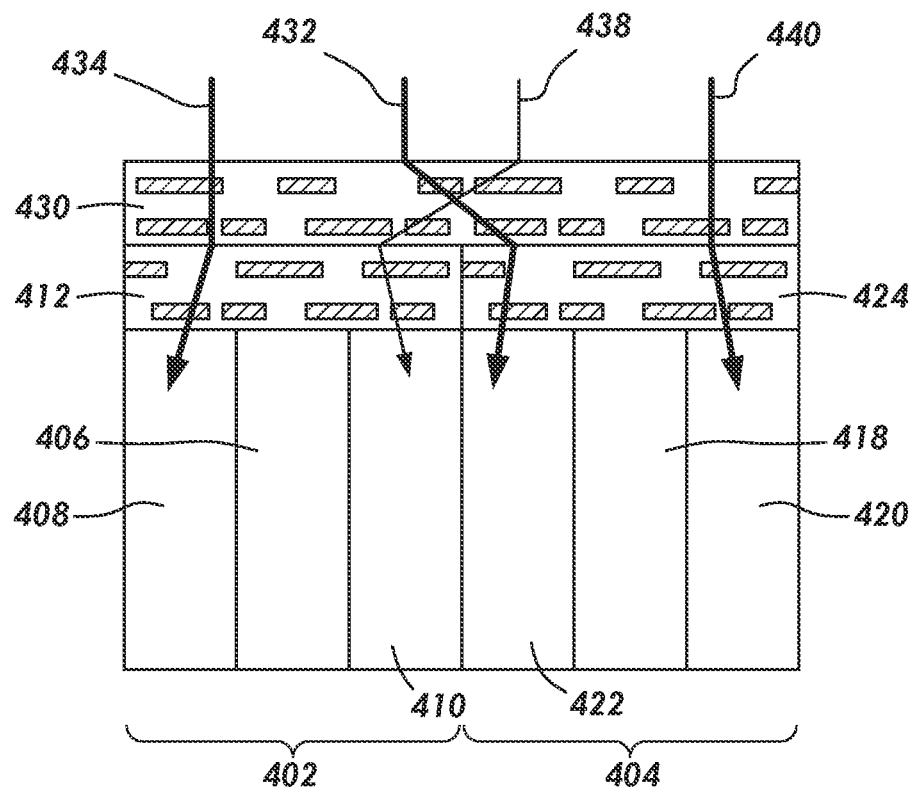
FIG. 4B is a cross-sectional view of an example of binned split-pixels with two spectral routers in accordance with some implementations.

In some implementations, a binned split-pixel may include a spectral router configured to perform spectral filtering. For example, in FIG. 4B, a spectral router 430 is positioned above the spectral router 412 of the red pixel 402 and the spectral router 424 of the green pixel 404. The portion of the spectral router 430 positioned above the red pixel 402 is configured to direct non-red light to neighboring pixels. Consider, for purposes of discussion, green light entering the red pixel 402. An example of green light is illustrated in FIG. 4B by arrow 432. The green light initially encounters the portion of the spectral router 430 positioned above the red pixel 402, which directs the green light to the spectral router 424 of the green pixel 404. The spectral router 424 of the green pixel 404 directs the green light to the outer photosensitive region 422 of the green pixel 404. The portion of the spectral router 430 positioned above the red pixel 402 is also configured to pass light having wavelengths corresponding to red. Consider, for purposes of discussion, red light entering the red pixel 402. An example of red light is illustrated in FIG. 4B by arrow 434. The red light initially encounters the portion of the spectral router 430 positioned above the red pixel 402, which passes the red light to the spectral router 412 of the red pixel 402. The spectral router 412 of the red pixel 402 directs the red light to the outer photosensitive region 408 of the red pixel 402.

In the example shown, the spectral router 430 abuts the spectral router 412, but in other cases one or more additional layers, such as oxide or planar layers, may reside between the spectral router 430 and the spectral router 412.

The portion of the spectral router 430 positioned above the green pixel 404 is configured to direct non-green light to neighboring pixels. Consider, for purposes of discussion, red light entering the green pixel 404. An example of red light is illustrated in FIG. 4B by arrow 438. The red light initially encounters the portion of the spectral router 430 positioned above of the green pixel 404, which directs the red light to the spectral router 412 of the red pixel 402. The spectral router 412 of the red pixel 402 directs the red light to the outer photosensitive region 408 of the red pixel 402. The portion of the spectral router 430 positioned above the green pixel 404 is also configured to pass light having wavelengths corresponding to green, such as between about 500 and 570 nm. Consider, for purposes of discussion, green light entering the green pixel 404. An example of green light is illustrated in FIG. 4B by arrow 440. The green light initially encounters the portion of the spectral router 430 positioned above the green pixel 404, which passes the green light to the spectral router 424 of the green pixel 404. The spectral router 424 of the green pixel 404 directs the green light to the outer photosensitive region 422 of the green pixel 404. In the example shown, the spectral router 430 abuts the spectral router 424, but in other cases one or more additional layers, such as oxide or planar layers, may reside between the spectral router 430 and the spectral router 424.

Figure 4C:
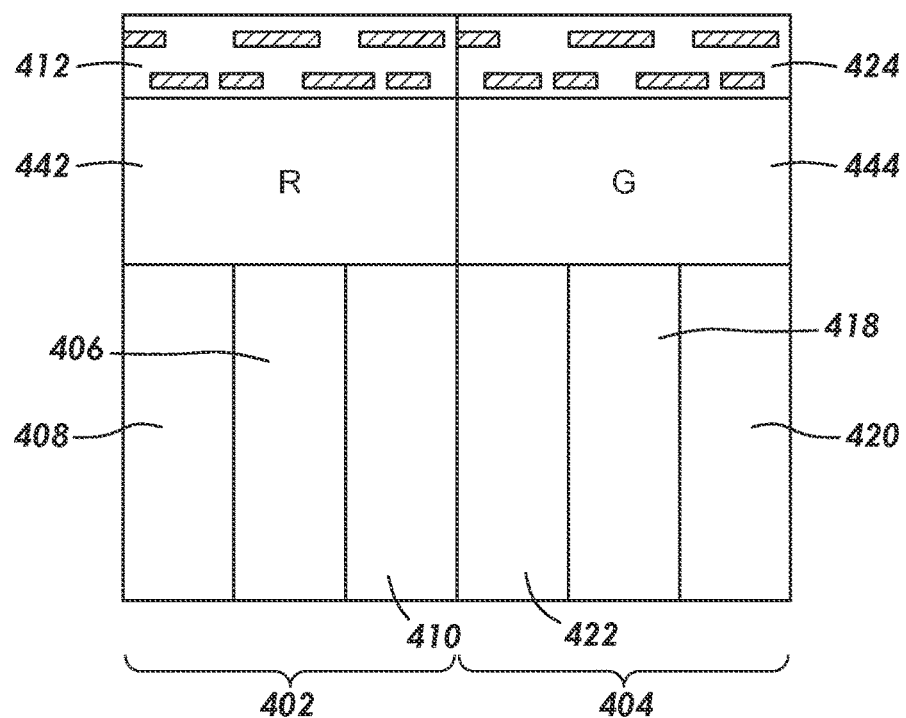
FIG. 4C is a cross-sectional view of an example of binned split-pixels with a spectral router and a spectral filter in accordance with some implementations.

In some implementations, a binned split-pixel may include a spectral filter. For example, the red pixel 402 shown in FIG. 4C includes a red spectral filter 442 configured to pass light having wavelengths corresponding to red and filter (or absorb) light of other colors. In the example shown, the red spectral filter 442 is positioned below the spectral router 412. In other implementations, the red spectral filter 442 may be positioned above the spectral router 412. Further, the green pixel 404 shown in FIG. 4C includes a green spectral filter 444 configured to pass light having wavelengths corresponding to green and filter (or absorb) light of other colors. In the example shown, the green spectral filter 444 is positioned below the spectral router 424. In other implementations, the green spectral filter 444 may be positioned above the spectral router 424.

Figure 4D:
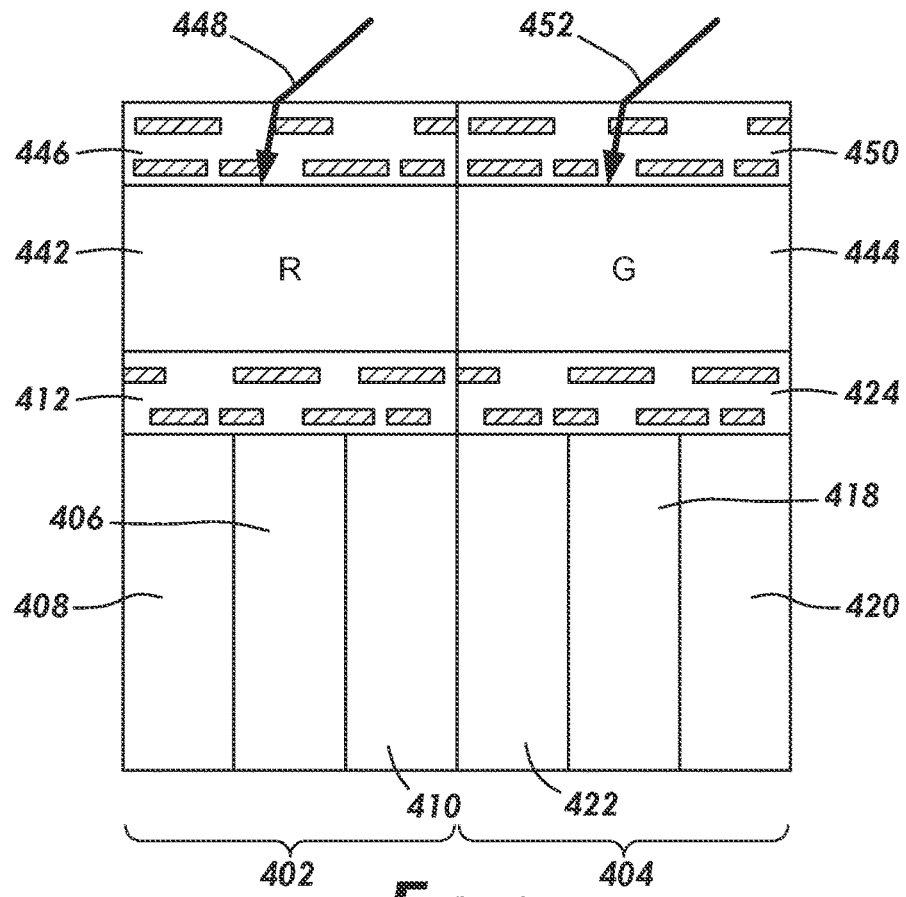
FIG. 4D is a cross-sectional view of an example of binned split-pixels with two spectral routers and a spectral filter in accordance with some implementations.

In some implementations, a binned split-pixel may include a spectral router configured collimate light. For example, the red pixel 402 shown in FIG. 4D includes a spectral router 446 positioned above the red spectral filter 442. The spectral router 446 is configured to collimate light prior to entering the red spectral filter 442. Stated otherwise, the spectral router 446 is designed and constructed to modify the angle of incidence of at least some photons prior to those photons being incident upon the red spectral filter 442. Consider, for purposes of discussion, light entering the red pixel 402. An example of such light is illustrated in FIG. 4D by arrow 448. The light initially encounters the spectral router 446, which focuses the light prior to entering the red spectral filter 442. Further, the green pixel 404 shown in FIG. 4D includes a spectral router 450 positioned above the green spectral filter 444. The spectral router 450 is configured to collimate light prior to entering the green spectral filter 444. Consider, for purposes of discussion, light entering the green pixel 404. An example of such light is illustrated in FIG. 4D by arrow 452. The light initially encounters the spectral router 450, which focuses the light prior to entering the green spectral filter 444.

Figure 4E:
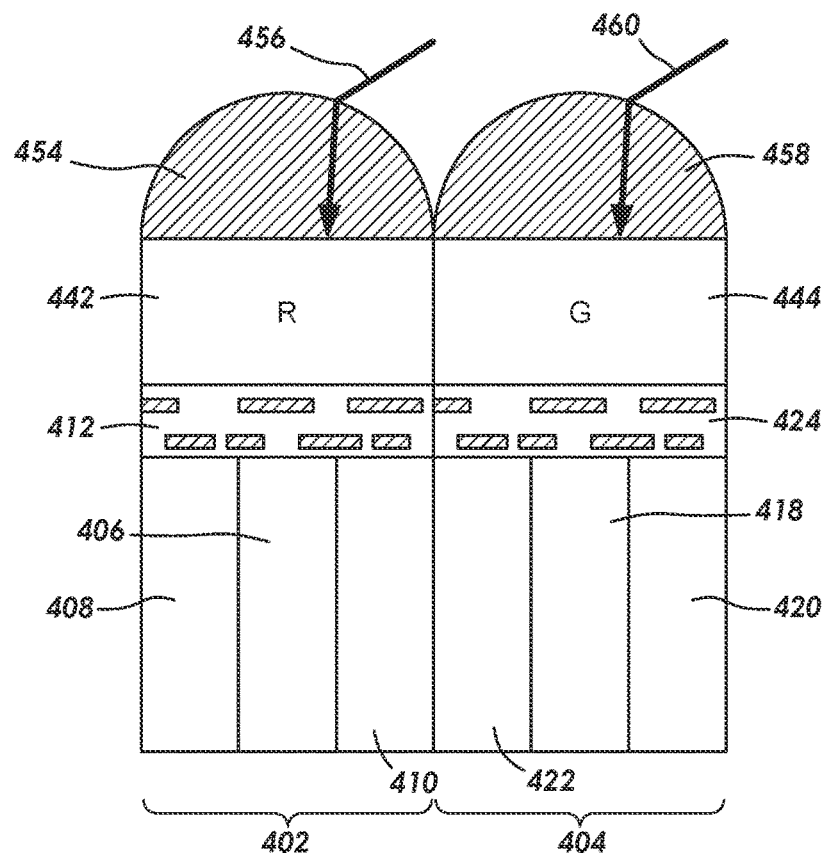
FIG. 4E is a cross-sectional view of an example of binned split-pixels with a microlens, a spectral filter, and a spectral router in accordance with some implementations.

In some implementations, a binned split-pixel may include one or more microlenses. For example, the red pixel 402 shown in FIG. 4E includes a microlens 454 positioned above the red spectral filter 442. The microlens 454 may be a convex lens designed and constructed to collimate light prior to entering the red spectral filter 442. Consider, for purposes of discussion, light entering the red pixel 402. An example of such light is illustrated in FIG. 4E by arrow 456. The light initially encounters the microlens 454, which focuses the light prior to entering the red spectral filter 442. In the example shown, the microlens 454 abuts the red spectral filter 442, but in other cases one or more additional layers, such as oxide or planar layers, may reside between the microlens 454 and the red spectral filter 442. Further, the green pixel 404 shown in FIG. 4E includes a microlens 458 positioned above the green spectral filter 444. The microlens 458 may be a convex lens designed and constructed to collimate light prior to entering the green spectral filter 444. Consider, for purposes of discussion, light entering the green pixel 404. An example of such light is illustrated in FIG. 4E by arrow 460. The light initially encounters the microlens 458, which focuses the light prior to entering the green spectral filter 444. In the example shown, the microlens 458 abuts the green spectral filter 444, but in other cases one or more additional layers, such as oxide or planar layers, may reside between the microlens 458 and the green spectral filter 444. While the example of FIG. 4E shows each microlens associated with at least three photosensitive regions, a given microlens may be associated with any non-zero number photosensitive regions. For example, a single microlens may span one photosensitive region, one image sensor pixel, or a plurality of image pixels.

In some implementations, a binned split-pixel may include a spectral router for spectral filtering and a spectral router for collimating light. For example, the red pixel 402 shown in FIG. 4F includes the spectral router 430, the spectral router 446, and the spectral router 412. The portion of the spectral router 430 positioned above the red pixel 402 is configured to direct non-red light to neighboring pixels. The spectral router 446 is configured to collimate light. The spectral router 412 is configured to direct light to the outer photosensitive regions 408 and 410 of the red pixel 402. Further, the green pixel 404 shown in FIG. 4F includes the spectral router 430, the spectral router 450, and spectral router 424. The portion of the spectral router 430 positioned above the green pixel 404 is configured to direct non-green light to neighboring pixels. The spectral router 450 is configured to collimate light. The spectral router 424 is configured to direct light to the outer photosensitive regions 420 and 422 of the green pixel 404.

Figure 4F:
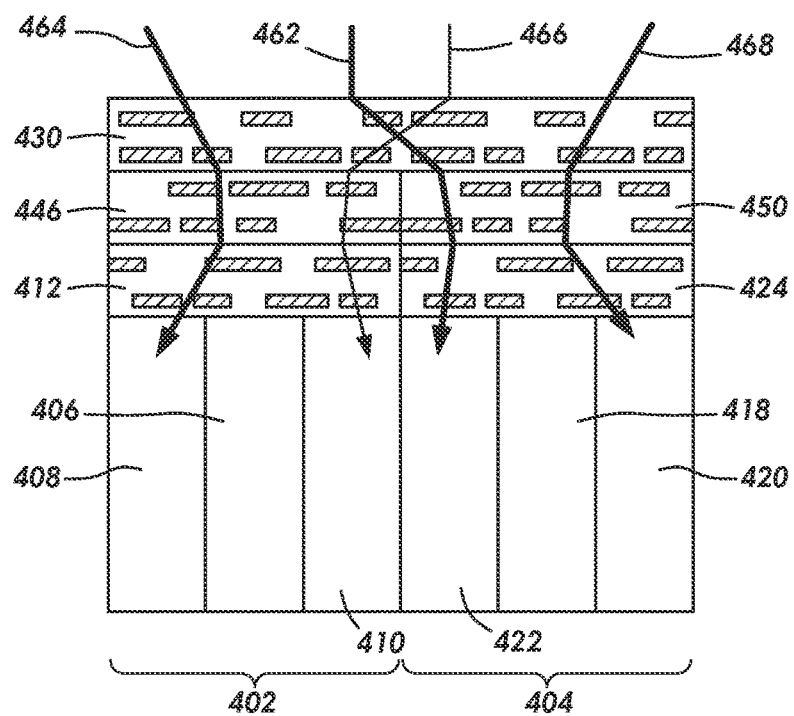
FIG. 4F is a cross-sectional view of an example of binned split-pixels with three spectral routers in accordance with some implementations.

Consider, for purposes of discussion, green light entering the red pixel 402. An example of such green light is illustrated in FIG. 4F by arrow 462. The green light initially encounters the portion of the spectral router 430 positioned above the red pixel 402, which directs the green light to the spectral router 450 of the green pixel 404. The spectral router 450 of the green pixel 404 focuses the green light toward the spectral router 424 of the green pixel 404. The spectral router 424 of the green pixel 404 directs the green light to the outer photosensitive region 422 of the green pixel 404. Now consider, for purposes of discussion, red light entering the red pixel 402. An example of such red light is illustrated in FIG. 4F by arrow 464. The red light initially encounters the portion of the spectral router 430 positioned above the red pixel 402, which allows the red light to pass through to the spectral router 446 of the red pixel 402. The spectral router 446 of the red pixel 402 focuses the red light toward the spectral router 412 of the red pixel 402. The spectral router 412 of the red pixel 402 directs the red light to the outer photosensitive region 408 of the red pixel 402. Next consider, for purposes of discussion, red light entering the green pixel 404. An example of such red light is illustrated in FIG. 4F by arrow 466. The red light initially encounters the portion of the spectral router 430 positioned above the green pixel 404, which directs the red light to the spectral router 446 of the red pixel 402. The spectral router 446 of the red pixel 402 focuses the red light toward the spectral router 412 of the red pixel 402. The spectral router 412 of the red pixel 402 directs the red light to the outer photosensitive region 410 of the red pixel 402. Finally consider, for purposes of discussion, green light entering the green pixel 404. An example of such green light is illustrated in FIG. 4F by arrow 468. The green light initially encounters the portion of the spectral router 430 positioned above the green pixel 404, which allows the green light to pass through to the spectral router 450 of the green pixel 404. The spectral router 450 of the green pixel 404 focuses the green light toward the spectral router 424 of the green pixel 404. The spectral router 424 of the green pixel 404 directs the green light to the outer photosensitive region 420 of the green pixel 404.

Figure 5:
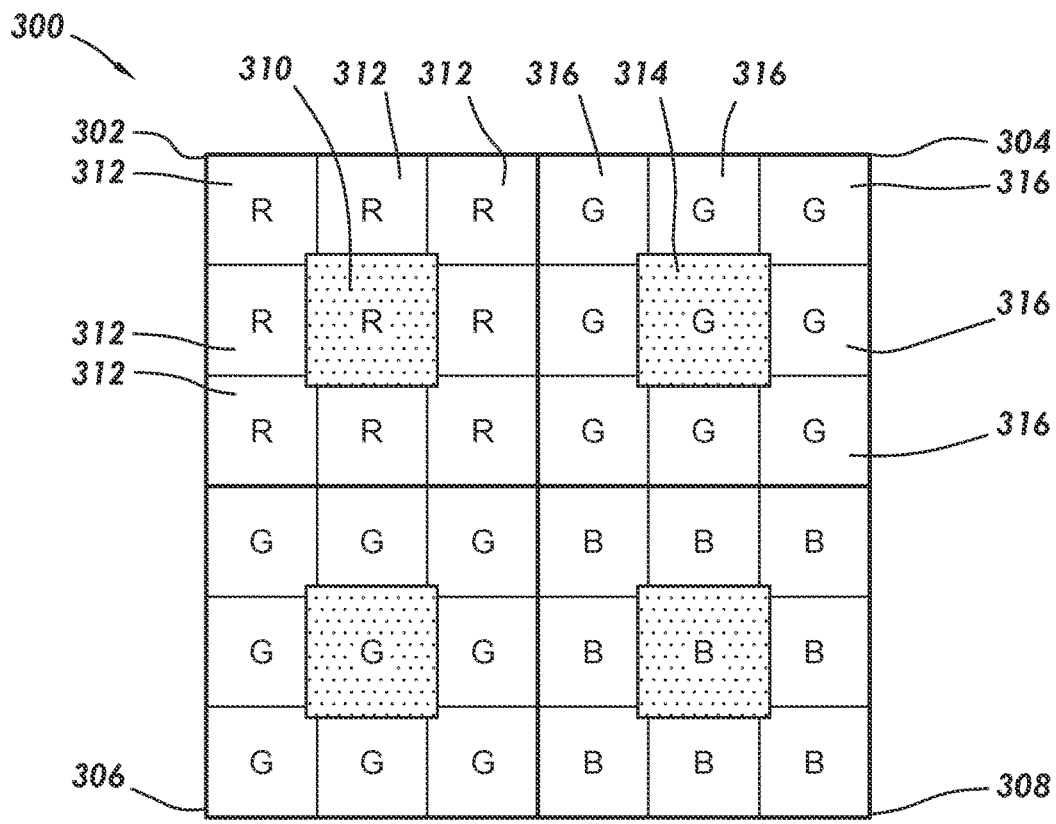
FIG. 5 is an overhead view of an example of a color pattern of binned split-pixels in which the collection surfaces of the high-light photodetectors are larger than the collection surfaces of the low-light photodetectors in accordance with some implementations.

Each photodetector in a binned split-pixel includes a collection surface that accepts incoming light. In some implementations, a binned split-pixel is designed such that the size of the collection surface of the high-light photodetector is the same as the sizes of the collection surfaces of each of the low-light photodetectors. For example, in FIG. 3A, the size of collection surface of the high-light photodetector 310 is the same as the sizes of the collection surfaces of each of the low-light photodetectors 312. In other implementations, a binned split-pixel is designed such that the size of the collection area of the high-light photodetector is different than the sizes of the collection surfaces of the low-light photodetectors. For example, in FIG. 5, the size of collection area of the high-light photodetector 310 is larger than the sizes of the collection surfaces of each of the low-light photodetectors 312. Alternatively, the size of collection area of the high-light photodetector 310 may be smaller than the sizes of the collection surfaces of each of the low-light photodetectors 312. Naturally, the actual sizes of collection surfaces in production units may vary slightly due to factors such as process variations.

Figure 6:
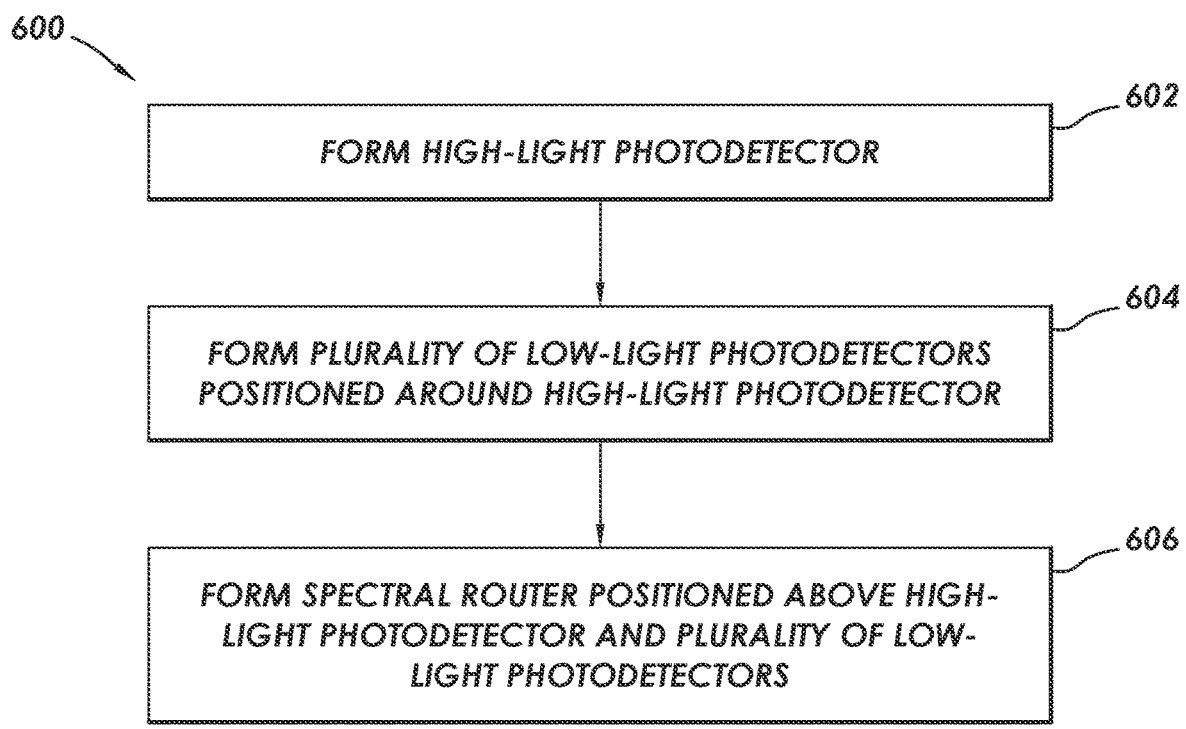
FIG. 6 is a flow diagram of an example of a method for constructing an image sensor pixel in accordance with some implementations.

FIG. 6 is a flow diagram of an example of a method 600 for constructing an image sensor pixel in accordance with some implementations. For simplicity of explanation, the method 600 is depicted in FIG. 6 and described as a series of operation. However, the operations can occur in various orders and/or concurrently, and/or with other operations not presented and described herein. At block 602, a high-light photodetector 310 is formed. At block 604, a plurality of low-light photodetectors 312 are formed. The plurality of low-light photodetectors 312 are positioned around the high-light photodetector 310. At block 606, a spectral router 412 is formed. The spectral router 412 is positioned above the high-light photodetector 310 and the plurality of low-light photodetectors 312.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various implementations of the present invention. Numerous variations and modifications will become apparent to those skilled in the art once the above disclosure is fully appreciated. It is intended that the following claims be interpreted to embrace all such variations and modifications.

What is claimed is:

1. An image sensor pixel, comprising:
   a high-light photodetector;
   a plurality of low-light photodetectors positioned around the high-light photodetector;
   a first spectral router positioned above the high-light photodetector and the plurality of low-light photodetectors, wherein the first spectral router is configured to route photons of selected wavelengths received at the first spectral router to one or more of the plurality of low-light photodetectors and away from the high-light photodetector;
   a second spectral router positioned above the first spectral router; and
   a third spectral router positioned between the first spectral router and the second spectral router, wherein a lower surface of the third spectral router is in contact, in its entirety, with an upper surface of the first spectral router, and wherein an upper surface of the third spectral router is in contact, in its entirety, with a lower surface of the second spectral router.

2. The image sensor pixel of claim 1, wherein the second spectral router is configured to:
   route photons of a first wavelength received at the second spectral router to the first spectral router, and
   route photons of a second wavelength received at the second spectral router to one or more neighboring image sensor pixels.

3. The image sensor pixel of claim 2, wherein the third spectral router is configured to collimate the photons of the first wavelength prior to entering the first spectral router.

4. The image sensor pixel of claim 1, wherein the high-light photodetector and the plurality of low-light photodetectors each include a collection surface, wherein a size of the collection surface of the high-light photodetector is different than a size of the collection surface of one of the plurality of low-light photodetectors.

5. The image sensor pixel of claim 1, wherein the image sensor pixel is integrated into a silicon substrate.

6. An imaging system comprising:
   a lens system;
   an imaging controller;
   and an image sensor in operational relationship with the lens system and electrically coupled to the imaging controller, wherein the image sensor including an array of image sensor pixels, wherein each of the image sensor pixels includes:
   a high-light photodetector, a plurality of low-light photodetectors positioned around the high-light photodetector,
   a first spectral router positioned above the high-light photodetector and the plurality of low-light photodetectors, wherein the first spectral router is configured to route photons of selected wavelengths received at the first spectral router of one or more of the plurality of low-light photodetectors and away from the high-light photodetector,
   and a spectral filter positioned above the first spectral router, wherein a lower surface of the spectral filter is in contact, in its entirety, with an upper surface of the first spectral router.

7. The imaging system of claim 6, wherein the spectral filter of each of the image sensors is configured to:
   direct photons of a first wavelength received at the spectral filter to the first spectral router, and
   block photons of a second wavelength received at the spectral filter.

8. The imaging system of claim 7, wherein each of the image sensor pixels further includes a second spectral router configured to collimate the photons of the first and second wavelengths prior to entering the spectral filter, and wherein the spectral filter is positioned between the first spectral router and the second spectral router, and wherein a lower surface of the second spectral router is in contact in its entirety with an upper surface of the spectral filter.

9. The imaging system of claim 6, wherein the high-light photodetector and the plurality of low-light photodetectors each include a collection surface, wherein a size of the collection surface of the high-light photodetector is different than a size of the collection surface of one of the plurality of low-light photodetectors.

10. The imaging system of claim 6, wherein the imaging system is at least one selected from the group consisting of an automobile, a vehicle, a camera, a cellular telephone, a tablet computing, a webcam, a video camera, a video surveillance system, and a video gaming system.

11. The image sensing system of claim 8, wherein a lower surface of the spectral filter is in contact in its entirety with an upper surface of the first spectral router.

12. The image sensing system of claim 6, wherein each of the image sensor pixels are integrated into a silicon substrate.

13. The image sensing system of claim 12, wherein each of the image sensor pixels further comprises a microlens positioned above the spectral filter, wherein a lower surface of the microlens is in contact, in its entirety, with an upper surface of the spectral filter, wherein the microlens comprises a convex upper surface, and wherein the microlens is configured to collimate light entering the spectral filter.

14. The image sensing system of claim 6, wherein the high-light photodetector of each of the image pixel sensors comprises an inner region in contact with the first spectral router, and wherein the plurality of low-light photodetectors of each of the image sensor pixels further comprise a plurality of outer regions surrounding the inner region.

15. An image sensor pixel, comprising:
   a high-light photodetector;
   a plurality of low-light photodetectors positioned around the high-light photodetector;
   a microlens positioned above the high-light photodetector and the plurality of low-light photodetectors;
   a spectral filter positioned above the high-light photodetector and the plurality of low-light photodetectors and below the microlens, wherein a lower surface of the microlens is in contact, in its entirety, with an upper surface of the spectral filter, and wherein the spectral filter is configured to allow photons of a first wavelength through spectral filter and further configured to block photons of a second wavelength; and
   a spectral router positioned above the high-light photodetector and the plurality of low-light photodetectors and below the spectral filter, wherein an upper surface of the spectral router is in contact, in its entirety, with a lower surface of the spectral filter.

16. The image sensor pixel of claim 15, wherein the microlens comprises a convex upper surface, and wherein the microlens is configured to collimate light entering the spectral filter.

17. The image sensor pixel of claim 15, wherein the image sensor pixel is integrated into a silicon substrate.

18. The image sensor pixel of claim 15, wherein the spectral router is configured to route photons of selected wavelengths received at the spectral router of one or more of the plurality of low-light photodetectors and away from the high-light photodetector.

19. The image sensor pixel of claim 15, wherein the high-light photodetector and the plurality of low-light photodetectors each include a collection surface, wherein a size of the collection surface of the high-light photodetector is different than a size of the collection surface of one of the plurality of low-light photodetectors.

20. The image sensor pixel of claim 15, wherein the high-light photodetector comprises an inner region in contact with the spectral router, and wherein the plurality of low-light photodetectors further comprise a plurality of outer regions surrounding the inner region and in contact with the spectral router.

* * * * *